United States Patent
Rakshit et al.

(10) Patent No.: US 11,701,835 B2
(45) Date of Patent: Jul. 18, 2023

(54) THREE-DIMENSIONAL PRINTING EMPLOYING MOVABLE BLOCKS OF A PRINTER BASE

(71) Applicant: KYNDRYL, INC., New York, NY (US)

(72) Inventors: Sarbajit K. Rakshit, Kolkata (IN); Daniela Trevisan, Porto Alegre (BR); Edson Gomes Pereira, Cotia (BR); Sergio Varga, Campinas (BR)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 17/500,041

(22) Filed: Oct. 13, 2021

(65) Prior Publication Data
US 2023/0110164 A1    Apr. 13, 2023

(51) Int. Cl.
*B29C 64/393* (2017.01)
*B33Y 50/02* (2015.01)

(52) U.S. Cl.
CPC ............ *B29C 64/393* (2017.08); *B33Y 50/02* (2014.12)

(58) Field of Classification Search
None
See application file for complete search history.

(56) References Cited

U.S. PATENT DOCUMENTS

| 10,046,500 B2 | 8/2018 | Shen et al. |
| 2004/0170459 A1* | 9/2004 | Taylor ................ B29C 64/182 400/70 |
| 2016/0318251 A1 | 11/2016 | Ederer et al. |
| 2017/0291372 A1 | 10/2017 | Milshtein et al. |

(Continued)

FOREIGN PATENT DOCUMENTS

| CN | 103350508 B | 10/2015 |
| CN | 105690764 B | 9/2017 |

(Continued)

OTHER PUBLICATIONS

Karpe, Kedar et al., "SPRINTER: A Discrete Locomotion Robot for Prevision Swarm Printing," 19th International Conference on Advanced Robotics, Dec. 2019, pp. 1-2 (Abstract Only).

(Continued)

*Primary Examiner* — Yung-Sheng M Tsui
(74) *Attorney, Agent, or Firm* — Eric C. Swanson, Esq.; Blanche E. Schiller, Esq.; Heslin Rothenberg Farley & Mesiti P.C.

(57) ABSTRACT

Three-dimensional printing of objects is facilitated. For an object to be printed in three-dimensions (3D), one or more contact points relating to the object are determined. A contact point is at least one location on a base of a 3D printer in which a portion of the object is to contact the base based on printing the portion of the object. A centralized location of the base at which one or more movable blocks of the base are to be moved to position the one or more contact points at the centralized location to facilitate printing of the one or more portions of the object is also determined. A print plan to be used to print the object in three-dimensions is created, in which the print plan includes one or more instructions to print at least the one or more portions of the object at the centralized location.

20 Claims, 11 Drawing Sheets

ADDITIONAL HORIZONTAL AND VERTICAL MOVEMENT OF PRINTER HEAD

(56) References Cited

U.S. PATENT DOCUMENTS

2018/0093420 A1    4/2018    Roberts et al.
2018/0133956 A1    5/2018    Buller et al.

FOREIGN PATENT DOCUMENTS

| | | |
|---|---|---|
| CN | 111251412 A | 6/2020 |
| DE | 102013021891 A1 | 6/2015 |
| TW | I611909 B | 1/2018 |

OTHER PUBLICATIONS

Chen, Chih-Chun et al., "How Can Swarm Roboticists Contribute to and Benefit from the Wisdom of Other Disciplines?" Nov. 2016, pp. 1-5.

Lin. Chien-Chou et al., "A Motion Planning of Swarm Robots Using Genetic Algorithm," 2010 International Conference on Broadband, Wireless Computing, Communication and Applications, Nov. 2010, pp. 1-2 (Abstract Only).

Hua, Yiwen, "Buildings 3D-Structures With an Intelligent Robot Swarm," May 2018, pp. 1-57.

Zarko, Jelena et al., "Influence of Printing Speed on Production of Embossing Tools Using FDM 3D Printing Technology," Journal of Graphic Engineering and Design, vol. 8(1), Jun. 2017, pp. 19-27.

Nazir, Aamer et al., "A High-Speed Additive Manufacturing Approach for Achieving High Printing Speed and Accuracy," Proceedings of the Institution of Mechanical Engineers, Part C: Journal of Mechanical Engineering Science, Jul. 2019, pp. 1-9 (Abstract Only).

Pilch, Zbigniew et al., "The Impact of Vibration of the 3D Printer Table on the Quality of Print," 2015 Selected Problems of Electrical Engineering and Electronics (WZEE), Sep. 2015, pp. 1-2 (Abstract Only).

Anonymous, "Method and System for Optimizing 3D Printer Movement," IP.com No. IPCOM000256896D, Jan. 8, 2019, pp. 1-2 (+ cover).

Anonymous, "Distributed 3D-Print Job Optimization," IP.com No. IPCOM000264070D, Nov. 9, 2020, pp. 1-6 (+ cover).

Mok, Kimberley, "Mobile Robots 'Swarm Print' 3D Large-Scale Structures," http://thenewstack.io/mobile-robots-swarm-print-3d-large-scale-structures, Sep. 27, 2018, pp. 1-15.

Wu, Chenming et al., "Learning to Accelerate Decomposition for Multi-Directional 3D Printing," IEEE Robotics and Automation Letters, Preprint Version, Accepted Jul. 2020, pp. 1-8.

Mell, Peter and Tim Grance, "The NIST Definition of Cloud Computing," National Institute of Standards and Technology, Information Technology Laboratory, Special Publication 800-145, Sep. 2011, pp. 1-7.

\* cited by examiner

ADDITIONAL HORIZONTAL AND VERTICAL MOVEMENT OF PRINTER HEAD

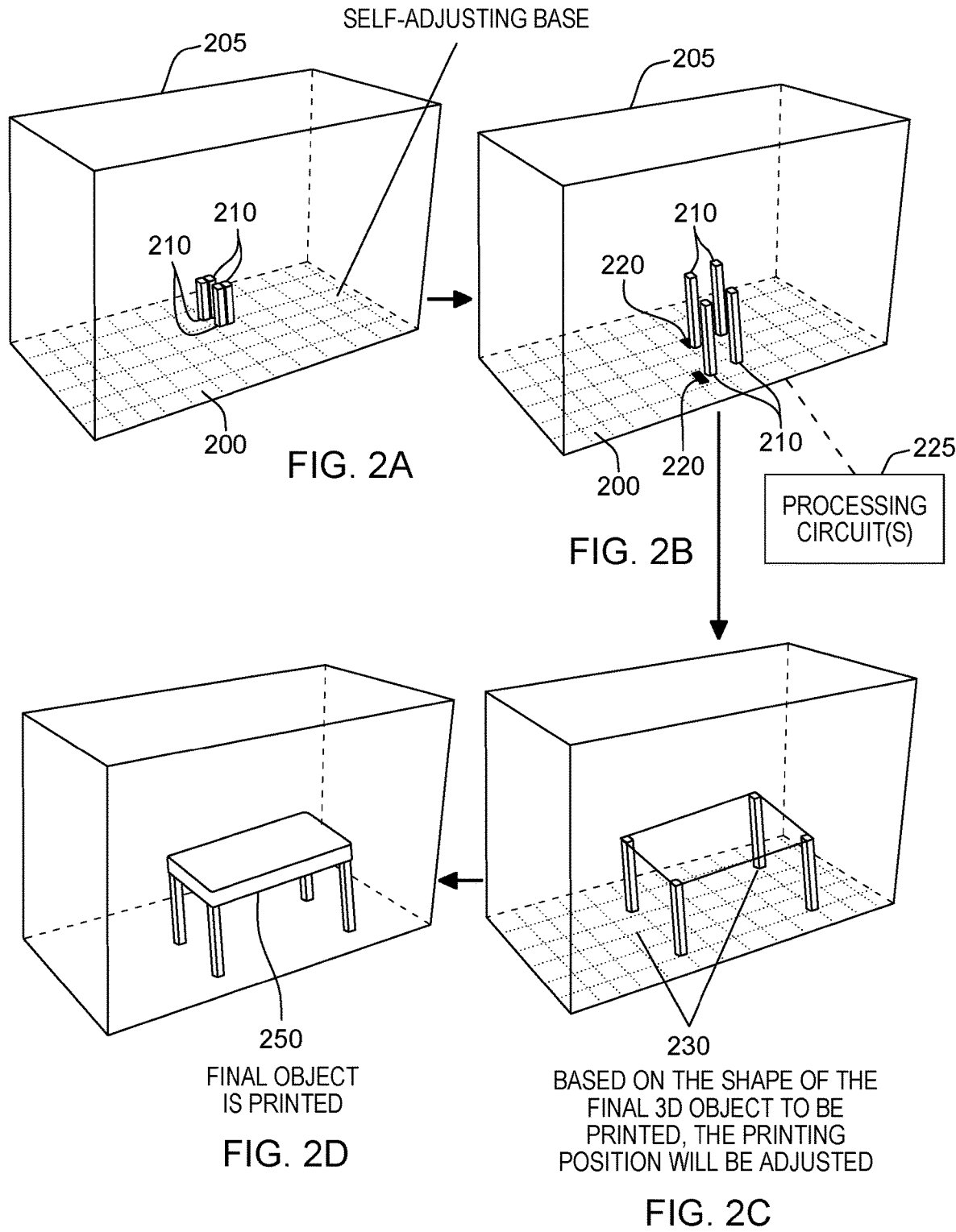

THREE-DIMENSIONAL PRINTING EMPLOYING MOVABLE BLOCKS OF A PRINTER BASE

BACKGROUND

One or more aspects relate, in general, to facilitating three-dimensional (3D) printing, and in particular, to improving processing relating to 3D printing.

Three-dimensional printing or additive manufacturing is a process of making three-dimensional solid objects from a digital file. The creation of a 3D printed object is achieved using additive processes. In an additive process, an object is created by laying down successive layers of material until the object is created. Each of these layers can be seen as a thinly sliced horizontal cross-section of the eventual object. Three-dimensional printing is the opposite of subtractive manufacturing which is the cutting out or hollowing out of a piece of metal or plastic via, for instance, a milling machine.

In printing a 3D object, a printer head prints the object in layers and if the target position of the areas being printed are at various distances, then the printer head travels, increasing printing time due to unproductive movement of the printer head.

SUMMARY

Shortcomings of the prior art are overcome, and additional advantages are provided through the provision of a system for facilitating three-dimensional printing. The system includes at least one processing circuit and the system is configured to perform a method. The method includes determining for an object to be printed in three-dimensions (3D) one or more contact points relating to the object. A contact point is at least one location on a base of a 3D printer in which a portion of the object is to contact the base based on printing the portion of the object. A centralized location of the base at which one or more movable blocks of the base are to be moved to position the one or more contact points at the centralized location to facilitate printing one or more portions of the object at the centralized location is determined. A print plan to be used to print the object in three-dimensions is created. The print plan includes one or more instructions to print at least the one or more portions of the object at the centralized location.

Computer-implemented methods and computer program products relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 2A-2D depict one example of using a self-adjusting base of a 3D printer to print a 3D object, in accordance with one or more aspects of the present invention;

DETAILED DESCRIPTION

Figures 1A, 1B:
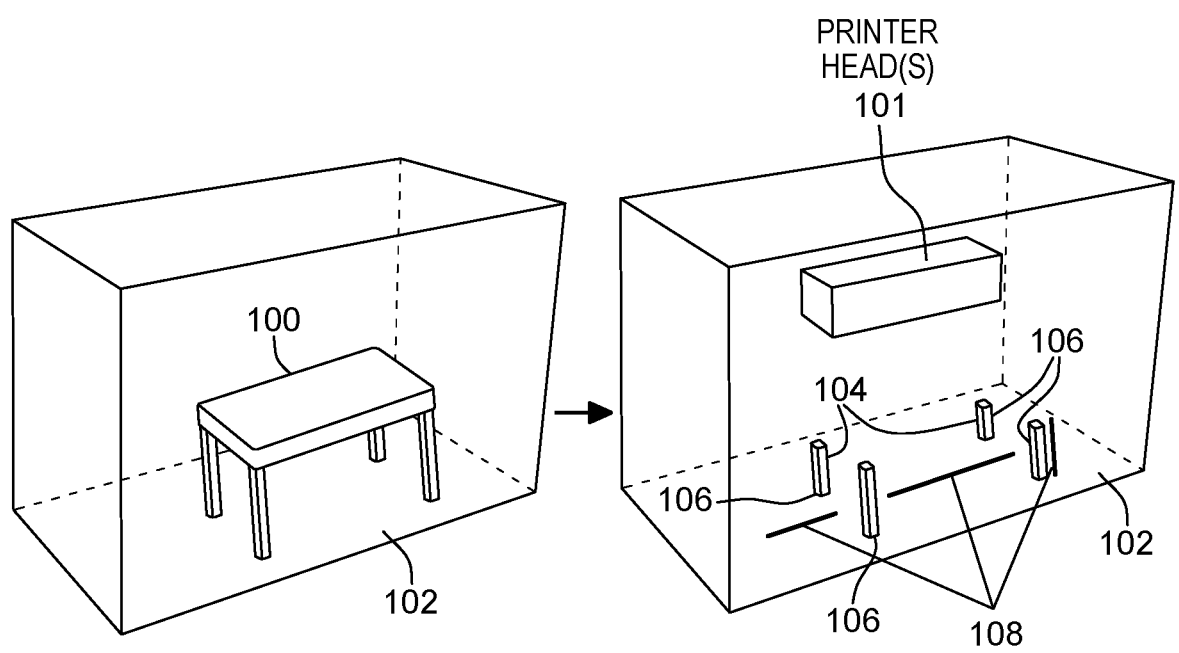
FIG. 1A depicts one example of a 3D object to be printed by a 3D printer, in accordance with one or more aspects of the present invention.
FIG. 1B depicts one example of portions of the 3D object of FIG. 1A to be printed by a 3D printer, in accordance with one or more aspects of the present invention.

In one or more aspects, a capability is provided to facilitate 3D printing of an object. The 3D printing is performed, in one example, using a 3D printer which includes, for instance, one or more printer heads to print an object that is positioned on a printer base (referred to herein as a base) of the printer. The base includes, in one or more aspects, one or more movable blocks that are positioned and/or repositioned to facilitate printing of the object. In one or more aspects, unproductive movement of one or more printer heads of the 3D printer is avoided or minimized, which reduces printing time and increases productivity of the 3D printer.

In one or more aspects, a print plan is created that considers the available movements of one or more movable blocks of the base of the 3D printer. The process identifies the dimensions of each movable block (also referred to as block, base block, self-moving block, grid block) and the number of blocks to be used to support one or more portions of the 3D object that are to contact the base or ground of the 3D printer when printed.

As an example, the 3D printer base has an array of movable blocks, each of which is capable of independently moving in different directions and to adjust the object being printed according to head movements used to complete a phase. The number of movable blocks on the base can be increased or decreased according to a configuration sent to the printer, and/or the number of movable blocks remain constant but the configuration indicates which of the movable blocks are to move and where to move. The blocks are self-moving, based on controls and/or instructions of a configuration, on the 3D printing surface (i.e., base) and relative position(s) of the blocks can be changed. The number of blocks to move can be selected dynamically according to the number of contact points of the object on the base, the dimension of the object, and the distance among the contact points. The movable blocks are, for instance, electronically controlled (e.g., via a processing circuit communicatively coupled to the printer) based on the shape and dimension of the 3D object being printed.

During the printing process, the process collects metrics from a current status of the object being printed. These metrics are analyzed to determine the shape and dimensions of the 3D object being printed to identify whether additional adjustments in the configuration are to be made to allow smooth movement of each individual block. This allows the printer to keep working during the smooth distancing of the blocks.

In one aspect, the process identifies the number of contact points on the base and the dimension of the contact area on the base. The shape and dimension of the contact points are identified, as well as when the contact points are connected with portions of the final shape of the object. The 3D printer identifies how close to bring the contact points on the base such that unproductive timing can be reduced.

Based on the shape and dimension of the object, the process identifies whether intermediate repositioning is to be performed and/or whether an additional printer head is to be used to complete the printing. The speed of repositioning is dynamically controlled based on, e.g., height and dimension of the individual portions which are contacting the base.

With the positioning and/or repositioning of individual blocks, in one embodiment, an appropriate lock is applied such that the relative position or vibration of the blocks can be restricted. The lock mechanism (e.g., magnetic locks controlled by signal(s) from one or more processing circuits) may be used to lock/unlock the blocks to gradually change the relative position of the individual blocks, enabling 3D printing to continue to be performed.

When the 3D printer starts printing the core of the object, in one or more aspects, the blocks are joined as a single surface; i.e., without additional movements, in one example.

As described with reference to FIGS. 1A-1B, in printing a 3D object 100 (e.g., a table or any other object), one or more printer heads 101 print the object in layers beginning, e.g., at a base 102. If the printing area has various target positions 104, such as portions 106 (e.g., table legs) of an object 100 (e.g., a table) to be printed at various positions, then a printer head travels between the target positions resulting in unproductive head movement of the printer head. For instance, in one example, object 100 is to be printed with a 3D printer in which object portions 106 (e.g., table legs) are at different positions, so the printer head travels for layer by layer printing or one-by-one portion printing. The printer uses additional horizontal and/or vertical movement 108 of the printer head.

Thus, in accordance with one or more aspects of the present invention, a 3D printer base (e.g., base 102) is integrated with self-movement in which one or more movable blocks are used in the base to initially provide a centralized location at which portions of the object to contact the base are printed and to move the object portions during the printing process. For instance, to print the portions connected to the base, one or more movable blocks are moved in close proximity (e.g., to a centralized location) prior to the printing and those object portions are printed, e.g., layer by layer, on the movable blocks. Thus, during the printing, the printer head does not move needlessly; instead, its movements are contained to a smaller area than the area in which the portions are to be placed when completed, which is a larger area, as shown in FIG. 1A. By using the movable blocks, the printing process is optimized and expedited. This is further described with reference to FIGS. 2A-2D.

As shown in FIGS. 2A-2D, a printing base 200 of a 3D printer 205 dynamically repositions a target printing area to reduce the unproductive movement of a printer head when printing a 3D object 250 (FIG. 2D). In one example, printing base 200 dynamically identifies when the object being printed is to be moved to one or more actual relative positions such that printing can be continued with reduced printer head movement. In FIGS. 2A-2B, the target areas to be printed (e.g., those areas to include portions of the 3D object to be printed) have moved close together to reduce unproductive movement of the printer head. FIG. 2B, like FIG. 2A, depicts portions 210 of a 3D object 250 (FIG. 2D) that are being printed in close proximity; however, in FIG. 2B, the depicted portions have additional printed layers (vertical height). The positions at which the portions in FIG. 2A and FIG. 2B are to be printed may be the same or different (e.g., one or more of the movable blocks are repositioned during the printing), depending on, e.g., whether it is determined that additional space is to be included between the portions when printing.

FIG. 2C depicts one example of the printing positions being adjusted 230 based on the shape of the final 3D object 250, an example of which is depicted in FIG. 2D.

Figure 3:
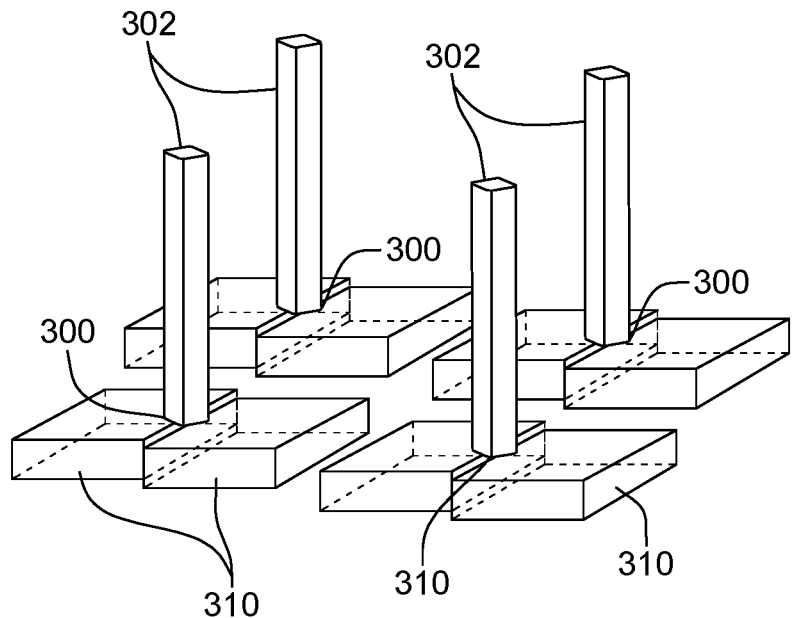
FIG. 3 depicts one example of movable blocks of a self-adjusting base of a 3D printer, in accordance with one or more aspects of the present invention.

Since in the example depicted in FIGS. 2A-2D, there are four contact points on the printer base (e.g., one for each of the four portions or legs to be printed), in one example, as shown in FIG. 3, each contact point 300 includes an object portion 302 being printed on one or more movable grid blocks 310. For instance, in this example, each object portion is printed on two movable blocks; however, in other examples, more or fewer blocks may be used for each object portion or contact point. Further, the number of movable blocks used for a contact point or object to be printed may differ for the various contact points.

As described herein, movable blocks 310 move to different positions depending on what is being printed by the 3D printer. For instance, if portions of the object contacting the base are to be printed, then the movable blocks are moved closer together. As other portions that connect the portions touching the base (e.g., the core, such as the table top, etc.) are printed, the movable blocks are moved further apart. Other examples are possible.

In one example, the movable base blocks are configured to communicate with one another, and a programmatic movement plan is created. In one example, the programmatic movement plan is implemented using one or more processing circuits. For instance, as shown in FIG. 2B, one or more processing circuits 225 are communicatively coupled to 3D printer 205. That is, as examples, one or more processing circuits may be embedded within printer 205 and/or separate from the printer but coupled thereto. As examples, the one more processing circuits may be included in a processor, computer system, computing unit etc., included within the printer and/or coupled to the printer via a physical attachment (e.g., wire, etc.) or a network, etc. Many possibilities exist.

In one example, an upper surface of the printer base is flat, and, as indicated, includes one or more movable blocks, which are moved appropriately, based on the 3D printing being performed. Further, in one example, as depicted in FIG. 2B, the base (e.g., base 200) includes one or more locks 220 (e.g., magnetic locks, or other types of locks) in one or more positions of the base to ensure the base is stable and not moving when locked. The lock(s) are placed in selected locations, which may be similar or different from those shown in FIG. 2B. As an example, each movable block includes a lock; however, in other embodiments, additional, fewer and/or other locations of the base include locks and/or are controlled by locks. The locking/unlocking of a lock is performed via a control of, e.g., a processing circuit and/or other controls, circuitry, etc. During the printing operation, if the base is to move (e.g., one or more of the base blocks are to move), then one or more of the locks are released and the base is repositioned (e.g., one or more movable blocks are moved). In the new position, the one or more locks are applied again to stabilize the base.

Figure 4:
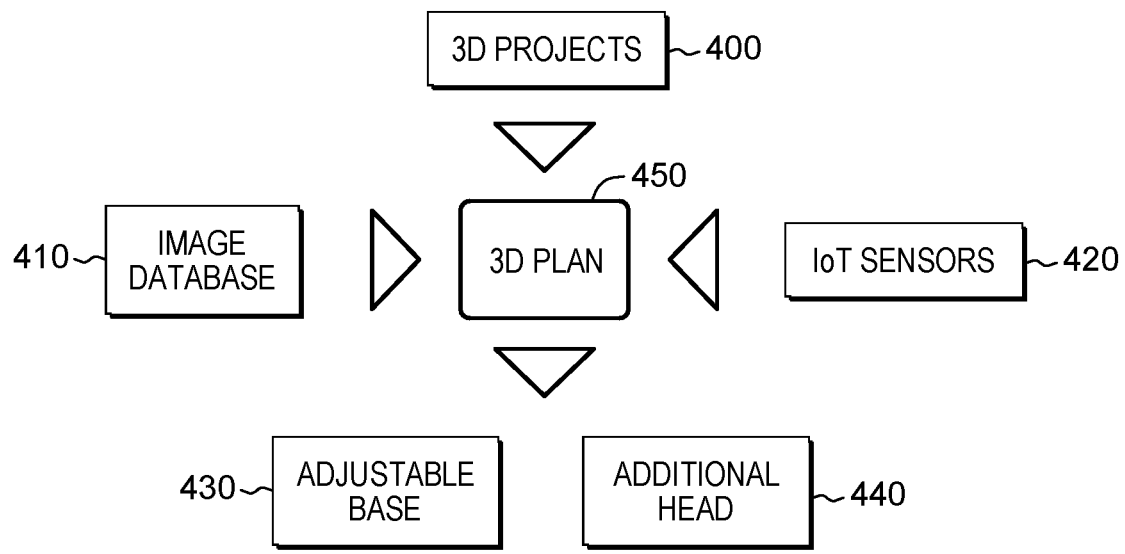
FIG. 4 depicts one example of components used in creating a 3D print plan to be used in printing a 3D object, in accordance with one or more aspects of the present invention.

One example of various components used in 3D printing of an object, in accordance with one or more aspects of the present invention, is described with reference to FIG. 4. As depicted, in one example, a data source of 3D projects 400 is created or obtained, and used to produce a 3D print plan 450 to be used to print one or more 3D objects. As an example, 3D projects 400 includes example projects to be printed, such as a table or other object. Also used, in one or more examples, is an image database 410, which is a data source with high-definition images of objects to be produced (e.g., images of, e.g., a table to be printed). A further input includes one or more Internet of Things (IoT) sensors 420, which are, for instance, devices, cameras, etc. capturing the work produced by the 3D printer in real-time to facilitate the printing (e.g., used to determine when one or more blocks are to be moved, etc.). A result is 3D print plan 450, which indicates, for instance, movements of one or more movable blocks 430 and/or use of one or more additional printer heads 440. In one example, print plan 450 may associate base movement 430 with the use of an additional printer head 440 to optimize the work.

One example of a process flow to be used to print a 3D object using a 3D printer configured in accordance with one or more aspects of the present invention is described with reference to FIGS. 5A-5C. In one or more aspects, one or more processing circuits communicatively coupled to a 3D printer (e.g., separate but coupled to, physically connected and/or embedded within the 3D printer) are used to perform one or more of the operations of FIGS. 5A-5C.

Figure 5A:
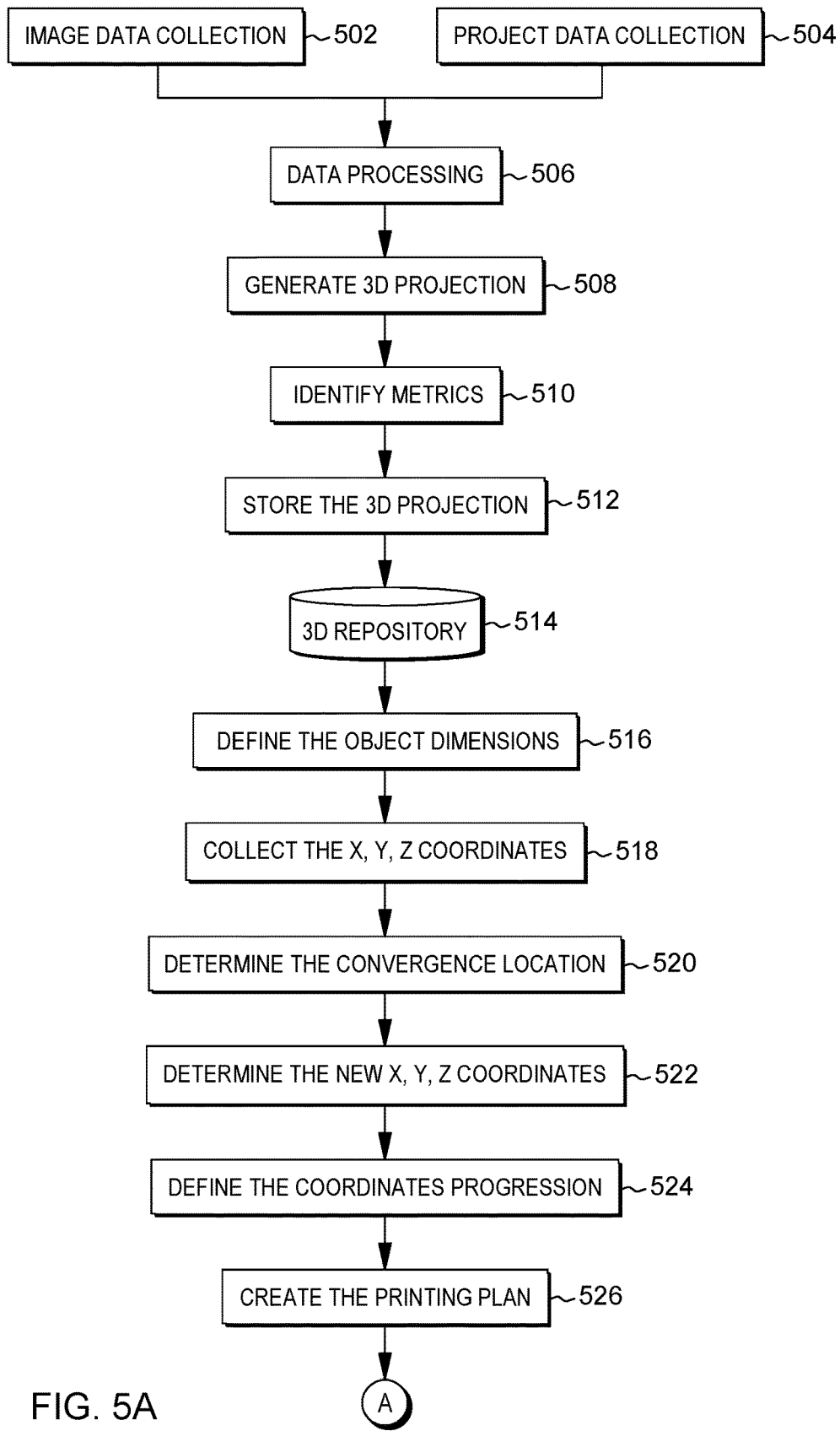
FIGS. 5A-5C depict one example of a process flow to create a 3D print plan to be used in printing a 3D object, in accordance with one or more aspects of the present invention.

Referring to FIG. 5A, in one example of a printing process 500, data of the object (referred to as image data) may be collected 502. As an example, devices, such as Internet of Things (IoT) devices, including, but not limited to, scans, sensors, cameras, etc., may be used to capture details of an object to be printed using, for instance, image recognition processing and/or other processing. Additionally, in one example, project data may be collected 504. For instance, 3D projects are obtained from different file formats, such as, e.g., 3DS, FBX (Filmbox), VRML (Virtual Reality Modeling Language), STL, OBJ, etc. Other data and/or data from other sources may also be collected.

The collected data is processed 506 to eliminate redundancies and to perform normalization to create a structured set of data. Based on the processed data, a 3D projection of the object to be printed is generated 508. In one example, an augmented reality process is used to generate 3D object visualization rendering details, which define, e.g., the metrics, sizes, surfaces, etc. of the 3D object to be printed.

Based on the 3D projection, metrics of the object are identified, collected and documented 510. For instance, the metrics of an object include, e.g., a number of portions of an object to be printed that contact the base (e.g., number of table legs), type of core (e.g., table top), sizes of various portions of the object, as well as other information defining the object. Further, in one example, the 3D projection data is stored 512 in a structure, such as a database or repository 514, to be used in the printing process 500.

Figure 6A:
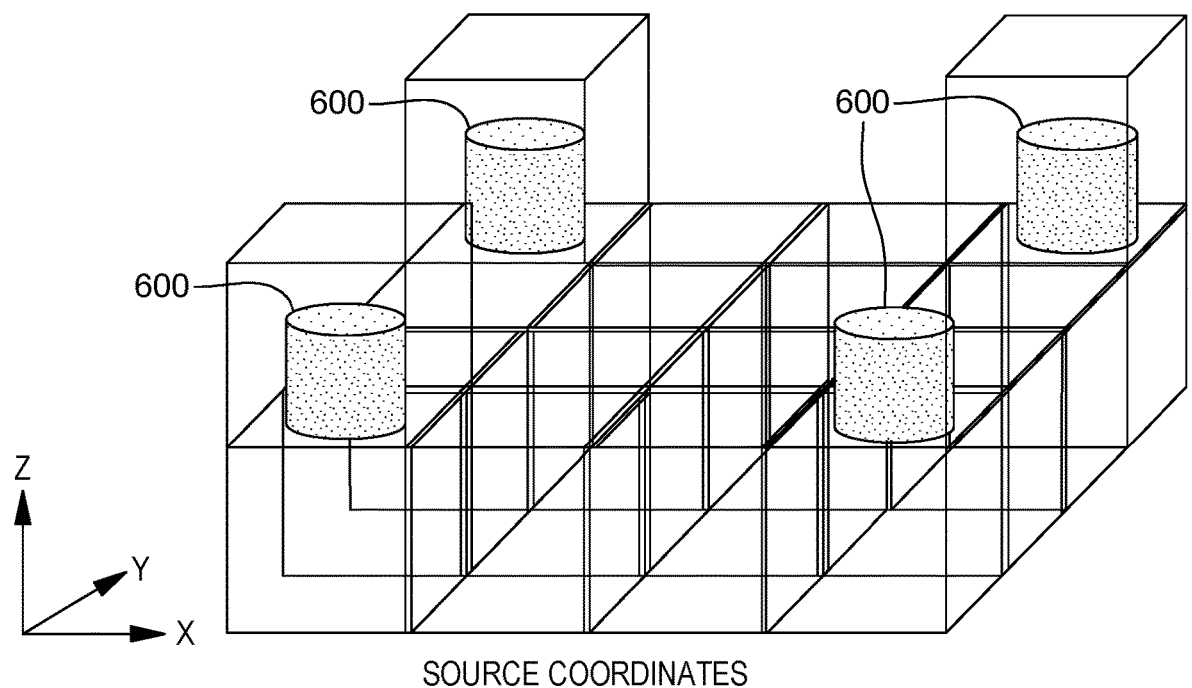
FIGS. 6A-6B depict one example of source coordinates and target coordinates, respectively, used to print a 3D object, in accordance with one or more aspects of the present invention.

The object dimensions are defined 516 by, for instance, reading the metrics from 3D repository 514 and determining the dimensions based on the metrics. The dimensions initially used are those stored for an initial setup. The data points created in a three-dimensional coordinate system are read to capture the spatial points defined by the axes X, Y and Z to determine a set of coordinates for the distant surfaces. In one example, as shown in FIG. 6A, the X, Y, Z source coordinates for image portions 600 are determined.

Returning to FIG. 5A, the object coordinates are collected 518. For instance, the X, Y, Z coordinates for each object portion that is to contact the base is checked and compared with the dimensions for one or more movable blocks composing the 3D printer base.

Figure 6B:
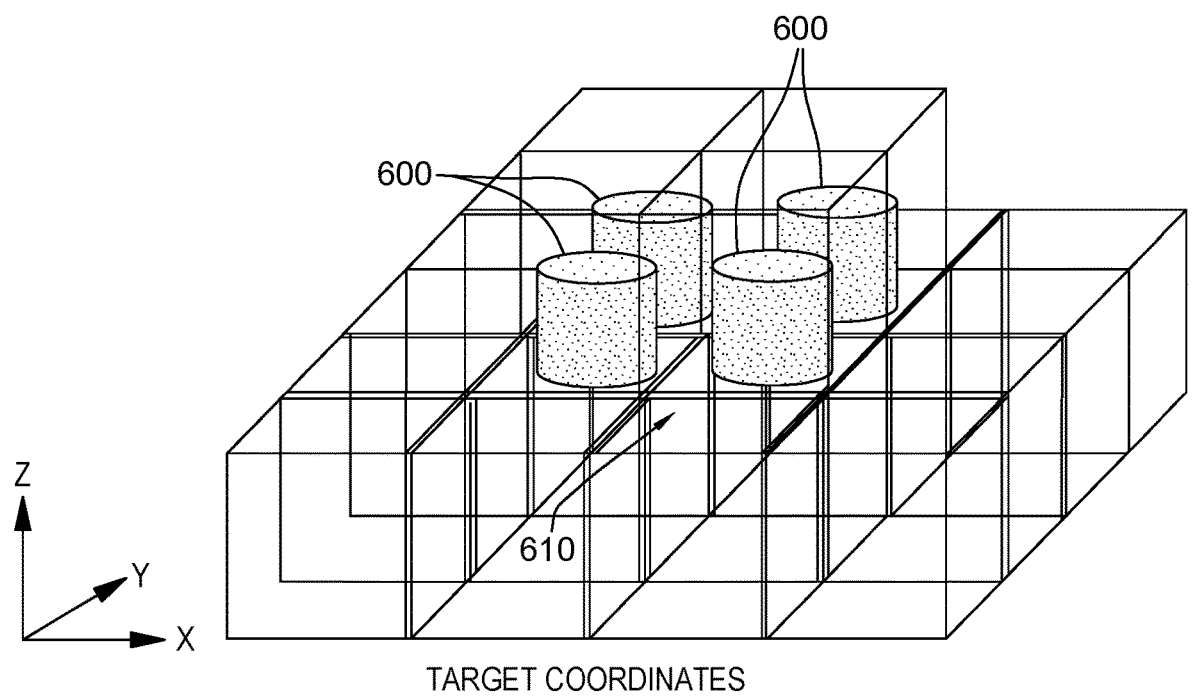

A convergence location (or centralized location), in which one or more movable blocks are to be moved to facilitate printing, is determined 520. For instance, a determination is made as to how many movable blocks are to be used as a starting point for the initial printer position and how to move them to a position (e.g., the convergence location) to facilitate the printing process. As shown, for instance, in FIG. 6B, image portions 600 are to be printed at a convergence location 610 to have the portions closer together, reducing the amount of printer head movement.

Returning to FIG. 5A, the new coordinates (e.g., X, Y and Z coordinates) of the 3D project are identified based on the convergence location 522. Further, in one example, the coordinates progression is defined 524. For instance, a new source position is compared with the original position to establish a set of configurations to move one or more movable blocks for each X, Y, Z coordinates until a defined point is reached. In one example, the defined point is the point at which the core of the image is to be printed to finalize the printing process without additional moves.

A printing plan (also referred to as a print plan, 3D print plan, etc.) is created 526 that includes one or more configurations employed to optimize the printing process. For instance, one or more coordinates are used to programmatically define one or more new points of convergency (e.g., convergence location 610 of FIG. 6B) on the printer base. The print plan is sent to the printer base and new coordinates X, Y, Z may be calculated to generate the new quadrants to be used. This is further described below with reference to FIG. 5C.

Figure 5B:
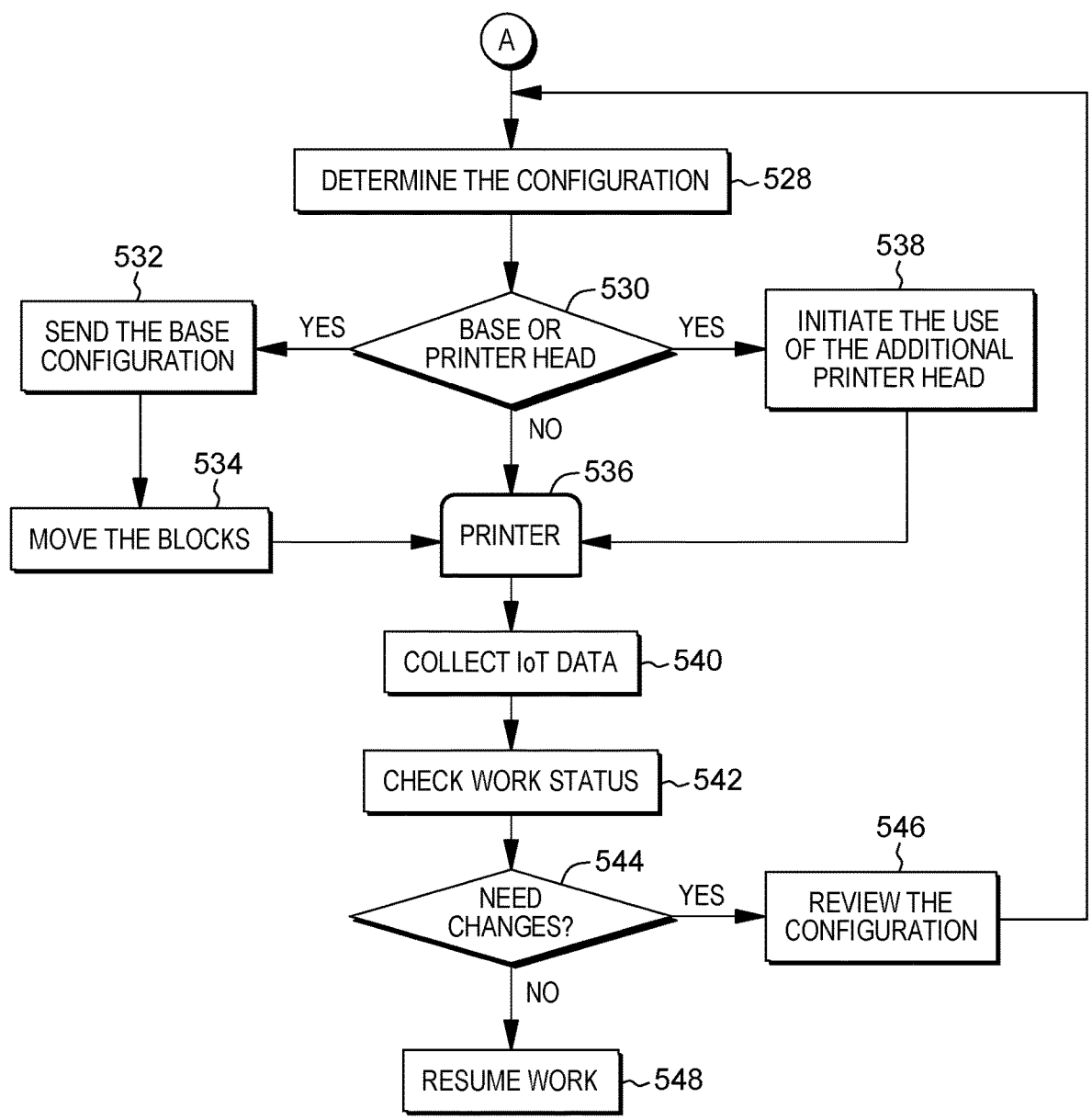
Figure 5C:
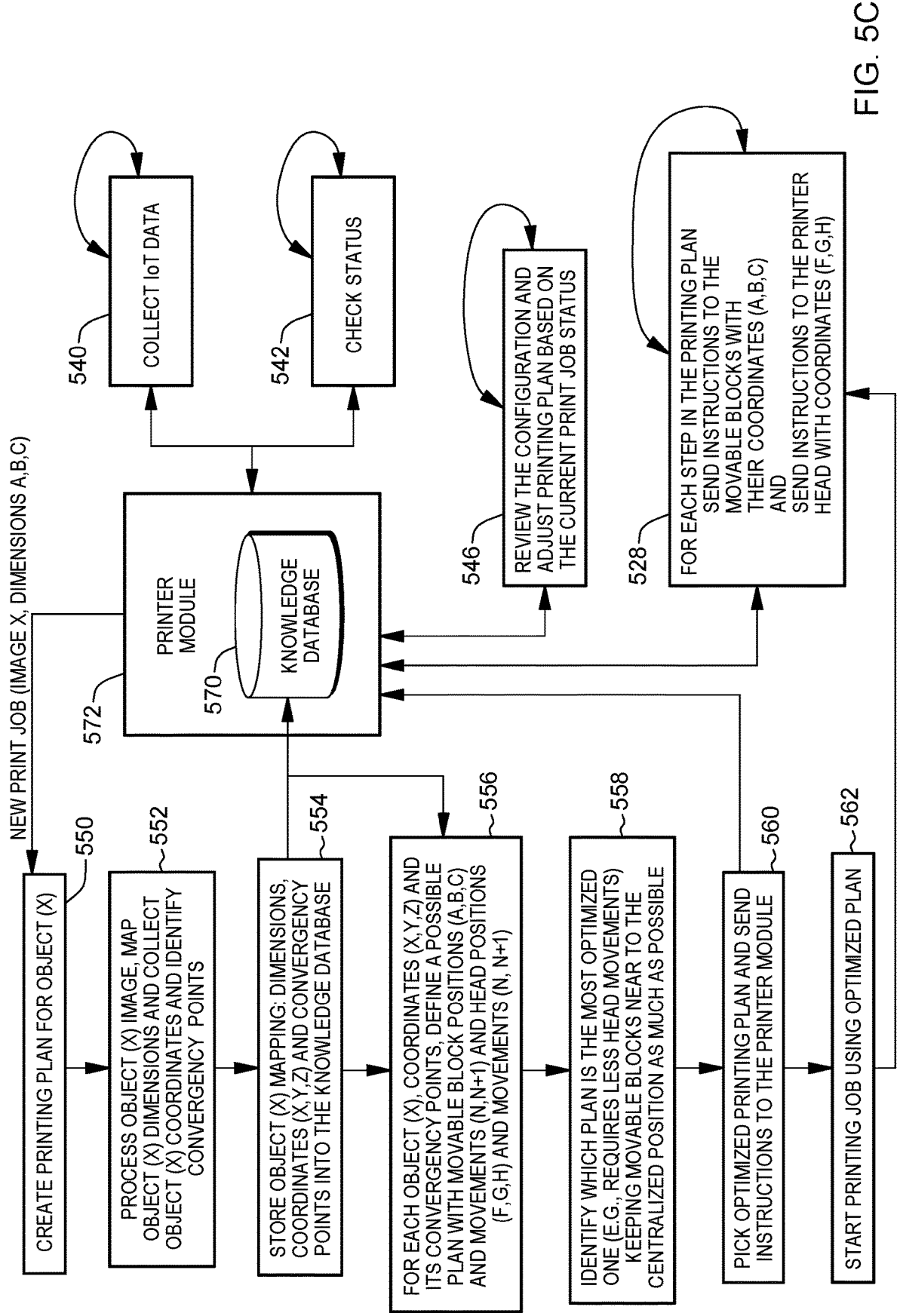

Based on the plan, referring to FIG. 5B, one or more configurations are determined 528 to be used for the printer base and/or the printer head, and the configurations are obtained (e.g., have, provided to, received, etc.) by the printer device (e.g., 3D printer 205). With the new set of coordinates in a configuration, one or more printer heads are positioned to start the printing process. Each coordinate represents, for instance, a movable block of the base to be moved.

A new set of configurations is to be applied to perform the printing. The new set of configurations includes a base configuration and/or a printer head configuration 530. The base configuration includes the base movements to be used to join image portions in the beginning of the impression. The base configuration is sent 532 to the printer 536 and one or more movable blocks of the base are positioned based on the base configuration 534. The new coordinates allow the printer 536 to initiate the printer process using a new point of convergency.

The printer head configuration initiates the use of at least one additional printer head 538 to be used by the printer 536 to print the 3D object.

Data is collected based on the printing 540. As an example, IoT input data is collected to identify the metrics for the work in progress. This is, e.g., an interactive process continuously being performed to check the new metrics. This verifies, for instance, if the specified coordinates are being respected.

Using, for instance, real-time data collected for the IoTs, the process reviews the status of the work to compare with the printing plan to provide additional adjustments, if indicated 542. The collected metrics are compared with the original dimensions to determine if the printing plan is to be adjusted. As an example, a new set of configurations is defined to be sent to the printer base to arrange the movable blocks allowing the portions to be separated further apart and repositioning the printer head(s). The process is repeated during the printing process, where metrics may be compared, and additional adjustments may be made. For instance, in one example of a table being printed by a 3D printer, after printing the table legs at a centralized location, one or more blocks of the base are moved to another location, based on the dimensions of the table, to separate the table legs to the appropriate locations prior to printing the table top. In other embodiments, intermediate repositioning may be used based on the object being printed. The printer plan is updated, and additional configurations are managed according to the status.

In one example, if changes are indicated 544, then the configuration is reviewed 546. For instance, based on the collected metrics, the process may request an update to the printing plan to allow one or more additional configurations to be delivered. The process continues at 528.

When no additional movements and/or configurations are indicated 544, the printing resumes as defined by the printing plan 548. The final coordinates are reached, and the core portion of the object is printed without additional movements.

Further details related to creating the printing plan are described with reference to FIG. 5C. As an example, to create a printing plan for an Object (X) 550, an image of Object (X) is processed, the dimensions of Object (X) are mapped, the coordinates of Object (X) are collected, and one or more convergency points are identified 552. The mapping of Object (X) including, e.g., the dimensions, coordinates and convergency points are stored 554, for instance, in a knowledge database 570 of a printer module 572 (or elsewhere). Printer module 572 is, e.g., communicatively coupled to the printer (e.g., separate but coupled to, physically connected and/or embedded). As examples, printer module 572 may be implemented by one or more processing circuits 225 (FIG. 2B), other processing circuits or components, or a combination thereof.

For the coordinates (X, Y, Z) and convergency points of each Object (X), one or more potential plans are defined with movable block positions (A, B, C) and movements (N, N+1) and printer head positions (F, G, H) and movements (N, N+1) 556.

A determination is made as to which plan is the most optimized of the one or more plans. The most optimized plan, assuming more than one plan, is, for instance, the one that employs fewer printer head movements keeping the blocks near to the centralized position, as much as possible 558. The optimized printing plan is chosen, and at least one action is taken. For instance, instructions are sent 560 to the printer module 572. Printing commences via a 3D printer using the selected plan 562.

In one example, processing continues at 528 in which for each step in the printing plan: instructions are sent to the movable blocks with their coordinates (A, B, C) and instructions are sent to the printer head with its coordinates (F, G, H). This completes one example of a printing process optimized in accordance with one or more aspects of the present invention.

As described herein, in one or more aspects, an intelligent process is provided to define a printing plan, based on the project or model to be printed, which indicates one or more base movements and/or the use of one or more additional printer heads to complete the printing process with fewer movements and optimizing the process through usage of cooperative 3D printing technology.

In one or more aspects, an intelligent process is provided to collect the project data and model to be printed to define a printing plan with a base configuration and/or use of an additional printer head. The base of the 3D printer has, in accordance with one or more aspects of the present invention, an array of movable grid blocks. Considering the shape and dimension of the 3D object to be printed, the movable grid blocks may auto-adjust their positions such that optimized printing head movement of one or more printer heads can be achieved during the printing operation.

Based on the shape and dimension of the object to be printed, the 3D printer identifies how many individual movable blocks will be involved for each printing portion which is contacting the base (e.g., 4 blocks are to be used to print one portion which is contacting the base), and accordingly individual movable blocks are moved together (e.g., the 4 blocks are considered as one unit and are moved together). In other examples, additional or fewer blocks may be used for a portion; different portions may use different numbers of blocks; and/or one or more blocks may move independently or differently from one or more other blocks used for printing a portion.

The shape and dimension of the object to be printed are analyzed and portions of the object contacting the base surface (may also be referred to as a ground or ground surface) are identified. Accordingly, the 3D printer programmatically identifies how the portions can be printed close by so that unproductive head movement can be controlled.

Based on the progress of the printing, one or more portions which are contacting the base surface to be repositioned are identified. Accordingly, the appropriate movable blocks change their relative positions or intermediate relative positions such that subsequent printing can be performed.

While printing is performed in any relative position of the areas which are contacting the base, in one example, the movable blocks are locked on the surface, such that there is no relative movement of the object being printed.

The system historically learns the effective relative position(s) of the portions of the objects which are contacting the base. Accordingly, the system is learning the effective relative positions of the printing areas such than unproductive movement of one or more printer heads is minimized.

One or more aspects of the present invention are inextricably tied to computer technology and/or other technological advancements and facilitate processing thereof. As an example, 3D printer processing is improved. Three-dimensional printing produces 3D objects that may be used in different industries. The printer prints objects of a certain level of specialization, detail and precision. In one or more aspects, the printer base and/or printer head uses one or more configurations to move the object by joining or spreading the parts of the 3D object being printed. This reduces the time to print the 3D object.

In one or more aspects, the process reduces the time to complete the 3D printer process by reducing the level of movements used to reach distant portions of the object, since the configurable base joins the distant portions as close as possible. Further, in one example, the printing lifecycle is extended since by reducing the level of movements, the time used to complete an object is reduced enabling the printer to print more objects in a given time frame.

Independent portions of an object are joined in a centralized location to allow one or more printer heads to reduce movements when printing the object and to accelerate the printing process. The centralized location is, for instance, in a single printing device. The individual portions are separated and distance is placed between them as the printing of the object core begins, in one example. One project is managed in the same printer allowing the use of existing resources and saving time for future print jobs.

Although embodiments are described herein, other variations and embodiments are possible.

Figure 7:
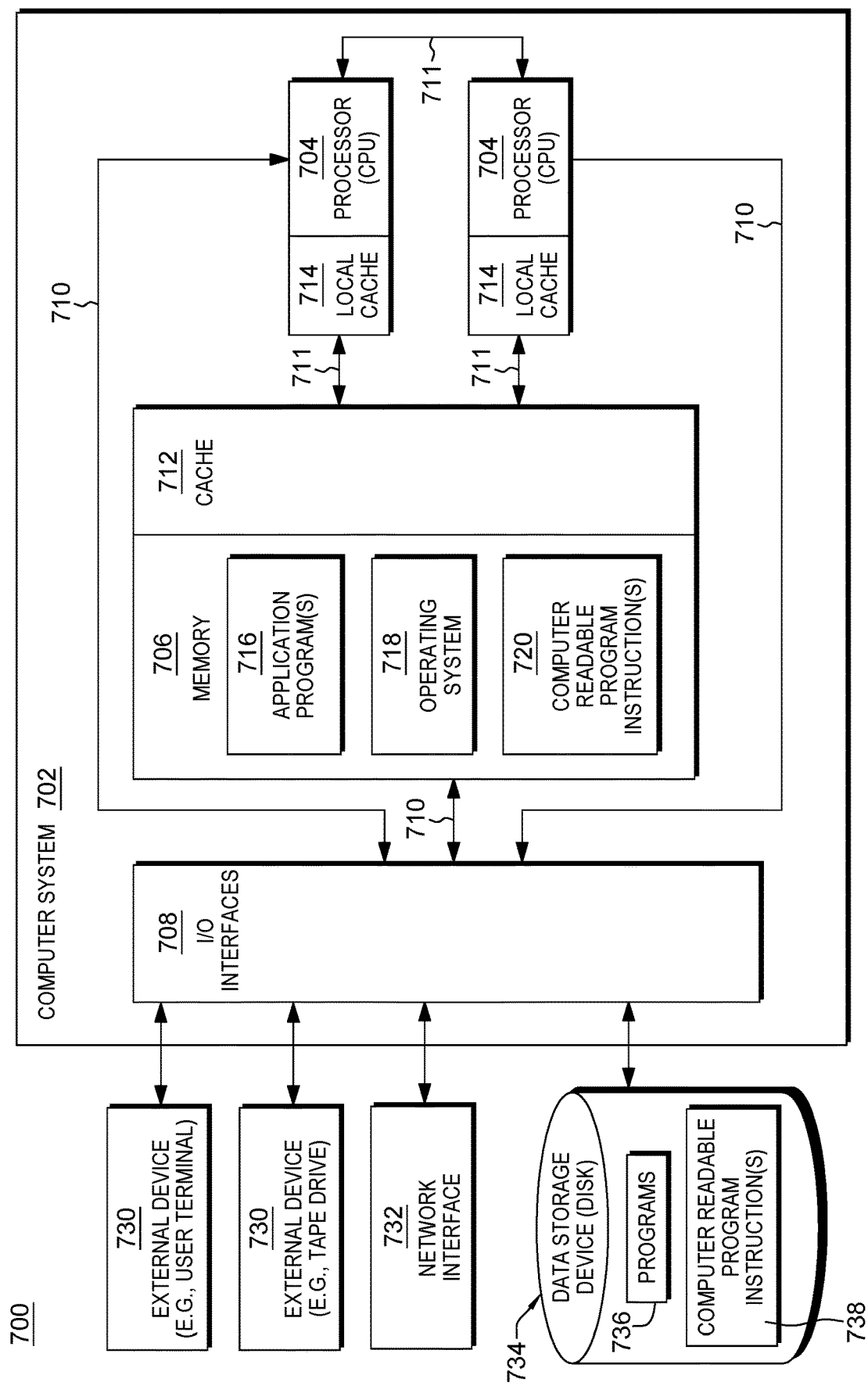
FIG. 7 depicts one example of a computing environment to incorporate and use one or more aspects of the present invention.

One or more aspects of the present invention may be incorporated and/or used in many computing environments. For instance, a computing environment communicatively coupled to the 3D printer may include one or more processing circuits used to perform one or more aspects of the present invention. One embodiment of a computing environment to incorporate and use one or more aspects of the present invention is described with reference to FIG. 7. As shown in FIG. 7, a computing environment 700 includes, for instance, a computer system 702 shown, e.g., in the form of a general-purpose computing device. Computer system 702 may include, but is not limited to, one or more processors or processing units 704 (e.g., central processing units (CPUs) and/or special-purpose processors, etc.), a memory 706 (a.k.a., system memory, main memory, main storage, central storage or storage, as examples), and one or more input/output (I/O) interfaces 708, coupled to one another via one or more buses and/or other connections. For instance, processors 704 and memory 706 are coupled to I/O interfaces 708 via one or more buses 710, and processors 704 are coupled to one another via one or more buses 711.

Bus 711 is, for instance, a memory or cache coherence bus, and bus 710 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 706 may include, for instance, a cache 712, such as a shared cache, which may be coupled to local caches 714 of one or more processors 704 via, e.g., one or more buses 711. Further, memory 706 may include one or more programs or applications 716, at least one operating system 718, and one or more computer readable program instructions 720. Computer readable program instructions 720 may be configured to carry out functions of embodiments of aspects of the invention.

Computer system 702 may communicate via, e.g., I/O interfaces 708 with one or more external devices 730, such as a user terminal, a tape drive, a pointing device, a display, and one or more data storage devices 734, etc. A data storage device 734 may store one or more programs 736, one or more computer readable program instructions 738, and/or data, etc. The computer readable program instructions may be configured to carry out functions of embodiments of aspects of the invention.

Computer system 702 may also communicate via, e.g., I/O interfaces 708 with network interface 732, which enables computer system 702 to communicate with one or more networks, such as a local area network (LAN), a general wide area network (WAN), and/or a public network (e.g., the Internet), providing communication with other computing devices or systems.

Computer system 702 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 702. Examples, include, but are not limited to: microcode, device drivers, redundant processing units, external disk drive arrays, RAID systems, tape drives, and data archival storage systems, etc.

Computer system 702 may be operational with numerous other general-purpose or special purpose computing system environments or configurations. Examples of well-known computing systems, environments, and/or configurations that may be suitable for use with computer system 702 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 8A:
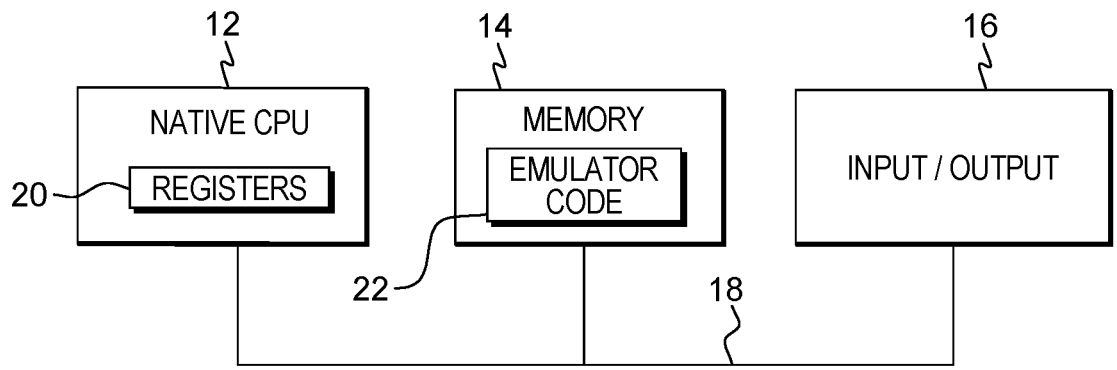
FIG. 8A depicts another example of a computing environment to incorporate and use one or more aspects of the present invention.

Another embodiment of a computing environment to incorporate and use one or more aspects of the present invention is described with reference to FIG. 8A. In this example, a computing environment 10 includes, for instance, a native central processing unit (CPU) 12, a memory 14, and one or more input/output devices and/or interfaces 16 coupled to one another via, for example, one or more buses 18 and/or other connections. As examples, computing environment 10 may include an IBM® Power® processor offered by International Business Machines Corporation, Armonk, N.Y.; an HP Superdome with Intel® processors offered by Hewlett Packard Co., Palo Alto, Calif.; and/or other machines based on architectures offered by International Business Machines Corporation, Hewlett Packard, Intel Corporation, Oracle, or others. IBM and Power are trademarks or registered trademarks of International Business Machines Corporation in at least one jurisdiction. Intel is a trademark or registered trademark of Intel Corporation or its subsidiaries in the United States and other countries.

Native central processing unit 12 includes one or more native registers 20, such as one or more general purpose registers and/or one or more special purpose registers used during processing within the environment. These registers include information that represents the state of the environment at any particular point in time.

Moreover, native central processing unit 12 executes instructions and code that are stored in memory 14. In one particular example, the central processing unit executes emulator code 22 stored in memory 14. This code enables the computing environment configured in one architecture to emulate another architecture. For instance, emulator code 22 allows machines based on architectures other than, e.g., the IBM® z/Architecture® instruction set architecture, such as Power processors, HP Superdome servers or others, to emulate the z/Architecture instruction set architecture and to execute software and instructions developed based on the z/Architecture instruction set architecture. z/Architecture is a trademark or registered trademark of International Business Machines Corporation in at least one jurisdiction.

Figure 8B:
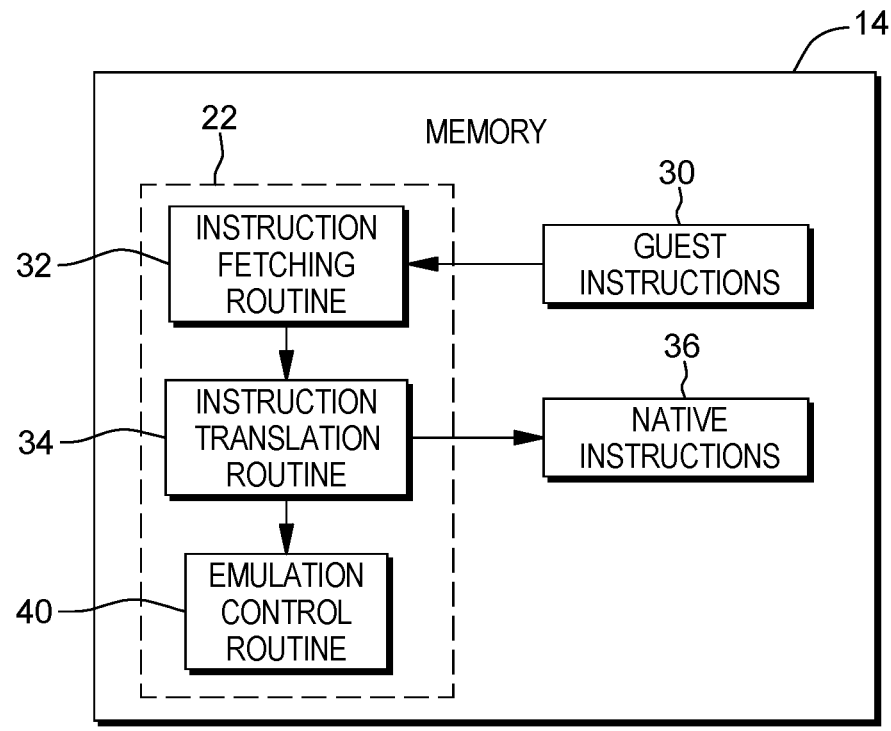
FIG. 8B depicts further details of the memory of FIG. 8A, in accordance with one or more aspects of the present invention.

Further details relating to emulator code 22 are described with reference to FIG. 8B. Guest instructions 30 stored in memory 14 comprise software instructions (e.g., correlating to machine instructions) that were developed to be executed in an architecture other than that of native CPU 12. For example, guest instructions 30 may have been designed to execute on a processor based on the z/Architecture instruction set architecture, but instead, are being emulated on native CPU 12, which may be, for example, an Intel processor. In one example, emulator code 22 includes an instruction fetching routine 32 to obtain one or more guest instructions 30 from memory 14, and to optionally provide local buffering for the instructions obtained. It also includes an instruction translation routine 34 to determine the type of guest instruction that has been obtained and to translate the guest instruction into one or more corresponding native instructions 36. This translation includes, for instance, identifying the function to be performed by the guest instruction and choosing the native instruction(s) to perform that function.

Further, emulator code 22 includes an emulation control routine 40 to cause the native instructions to be executed. Emulation control routine 40 may cause native CPU 12 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 36 may include loading data into a register from memory 14; storing data back to memory from a register; or performing some type of arithmetic or logic operation, as determined by the translation routine.

Each routine is, for instance, implemented in software, which is stored in memory and executed by native central processing unit 12. In other examples, one or more of the routines or operations are implemented in firmware, hardware, software or some combination thereof. The registers of the emulated processor may be emulated using registers 20 of the native CPU or by using locations in memory 14. In embodiments, guest instructions 30, native instructions 36 and emulator code 22 may reside in the same memory or may be disbursed among different memory devices.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention. For instance, each may be configured to incorporate and/or use one or more aspects of a 3D printing process and/or one or more processing circuits to implement and/or use one or more aspects of a 3D printing process, in accordance with one or more aspects of the present invention.

Although various embodiments are described herein, many variations and other embodiments are possible without departing from a spirit of aspects of the present invention. It should be noted that, unless otherwise inconsistent, each aspect or feature described herein, and variants thereof, may be combinable with any other aspect or feature.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
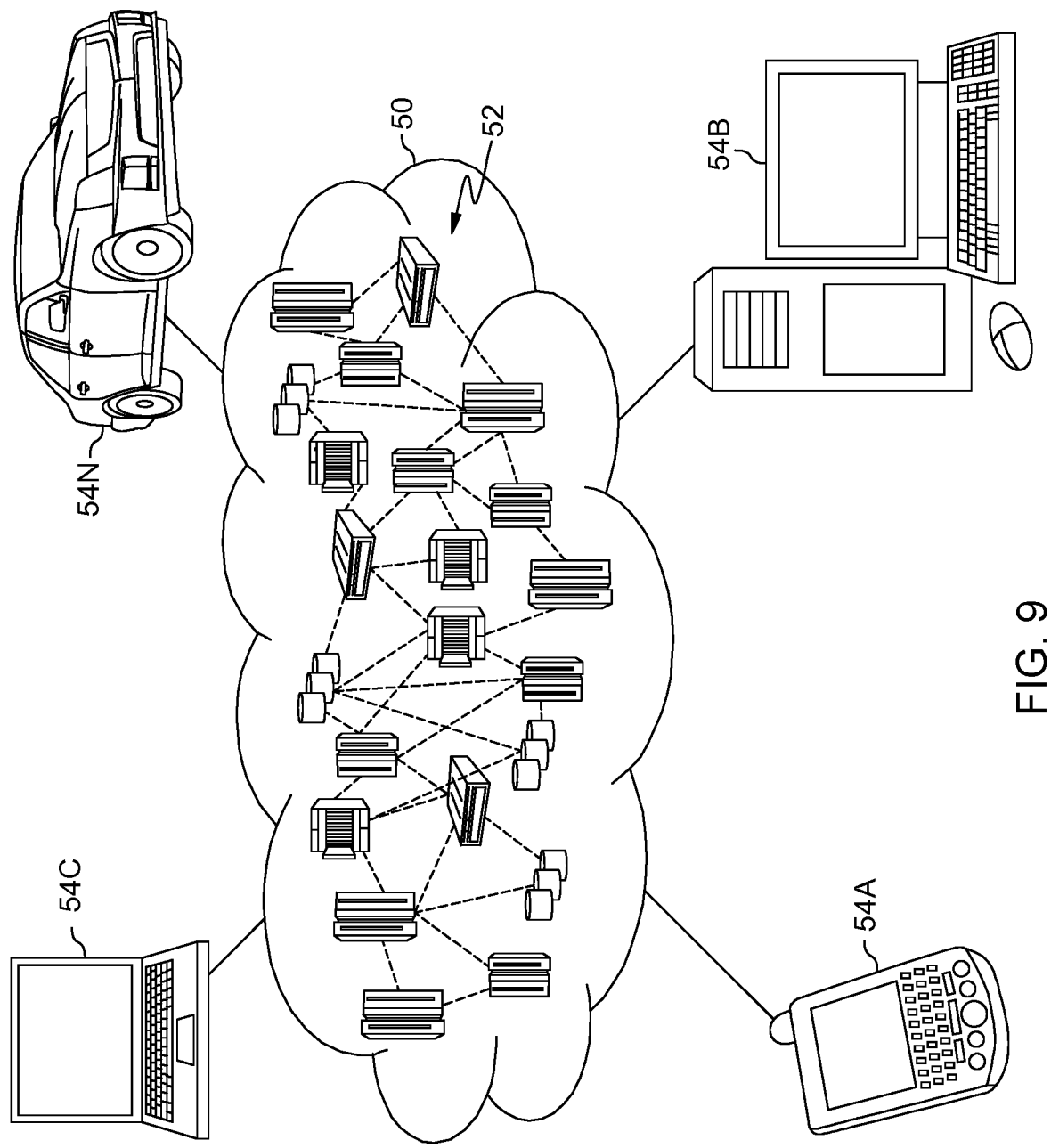
FIG. 9 depicts one embodiment of a cloud computing environment, in accordance with one or more aspects of the present invention.

Referring now to FIG. 9, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 52 and cloud computing environment 50 can communicate with any type of computerized device over any type of network and/or network addressable connection (e.g., using a web browser).

Figure 10:
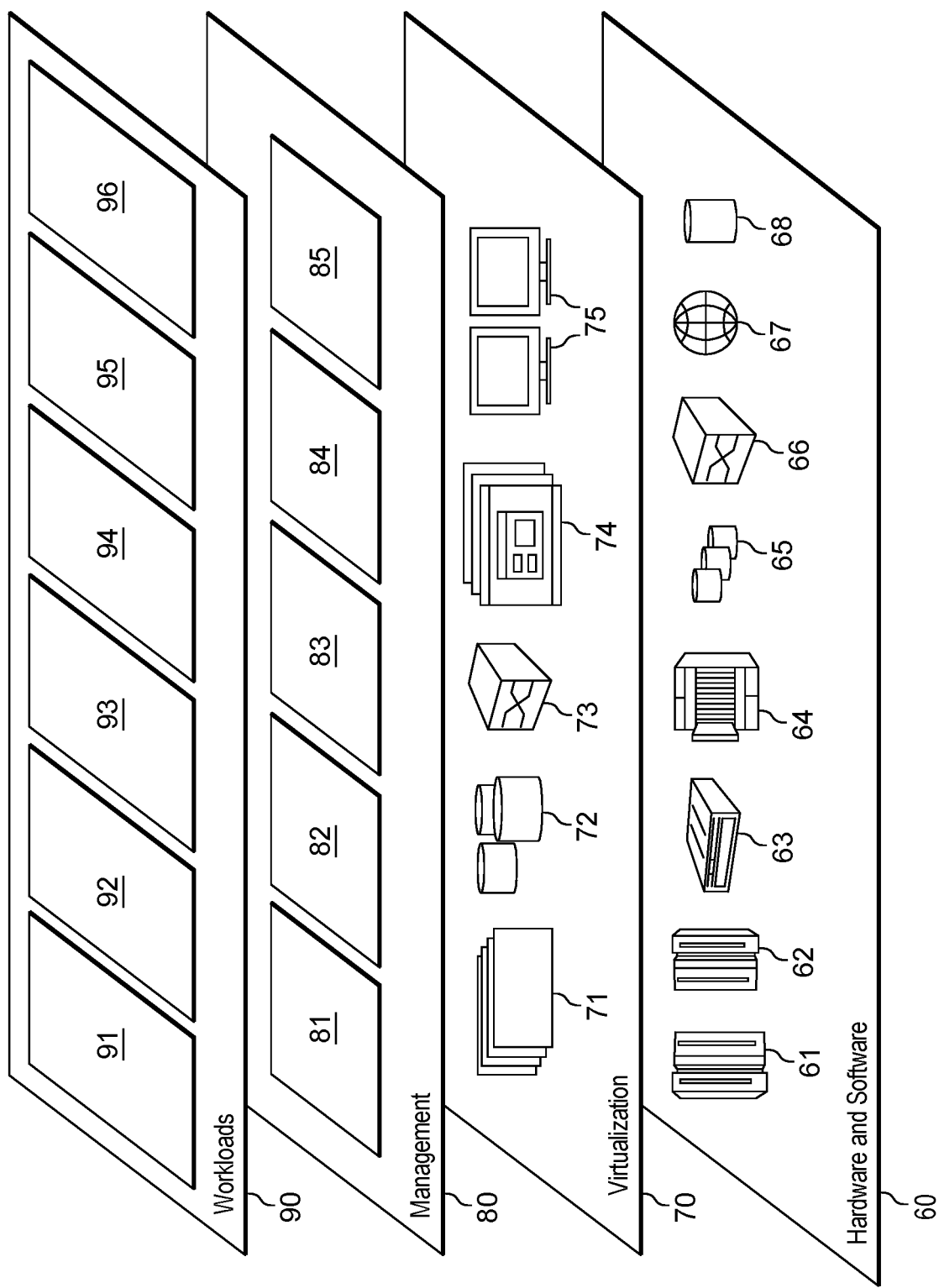
FIG. 10 depicts one example of abstraction model layers, in accordance with one or more aspects of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and 3D printing processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, different types of printing operations and/or printers may be employed. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A system for facilitating three-dimensional printing of objects, the system comprising:
   at least one processing circuit, wherein the at least one processing circuit is configured to perform a method, said method comprising:
      determining for an object to be printed in three-dimensions (3D) one or more contact points relating to the object, wherein a contact point is at least one location on a base of a 3D printer in which a portion of the object is to contact the base based on printing the portion of the object;
      determining a centralized location of the base in x and y directions at which one or more movable blocks of the base are to be moved to position the one or more contact points at the centralized location to facilitate printing one or more portions of the object at the centralized location, the centralized location being a region of the base in which the one of more portions of the object are printed in close proximity in the x and y directions; and
   creating at least one print plan to be used to print the object in three-dimensions, the at least one print plan comprising one or more instructions to print at least the one or more portions of the object at the centralized location and one or more addition instructions to reposition in at least one direction of the x and y directions at least one movable block of the one or more movable blocks to a different position away from the centralized location to continue printing the object.

2. The system of claim 1, wherein the method further comprises:
   initiating an action based on creating, at least, a print plan of the at least one print plan, the initiating the action comprising, at least, providing the print plan to be used in printing the at least one or more portions of the object at the centralized location.

3. The system of claim 1, wherein the one or more additional instructions comprise at least one instruction to print one or more remaining portions of the object, the one or more remaining portions of the object including a core of the object.

4. The system of claim 1, wherein the method further comprises determining a number of movable blocks to be used to position the one or more contact points.

5. The system of claim 4, wherein the determining the number of movable blocks comprises:
   identifying a dimension of a movable block;
   determining at least one dimension of at least one portion of the object; and
   selecting the number of movable blocks based on the dimension of the movable block and the at least one dimension of the at least one portion of the object.

6. The system of claim 1, wherein the method further comprises:
   determining, based on performing, via, at least, a print plan of the at least one print plan, 3D printing of at least a part of the object, one or more metrics of a current status of the 3D printing of the object;
   determining, based on the metrics, whether additional movement of at least one movable block of the base is to be performed; and
   providing, based on determining that additional movement is to be performed, an indication of the additional movement of the at least one movable block to facilitate the performing the 3D printing.

7. The system of claim 1, wherein the method further comprises providing an indication to lock the one or more movable blocks in position subsequent to moving the one or more movable blocks to prevent the one or more movable blocks from further movement.

8. The system of claim 1, wherein the one or more additional instructions comprise at least one instruction to reposition, one or more times, at least one movable block of the one or more movable blocks to one or more different positions to continue printing the object.

9. The system of claim 1, wherein the method further comprises:
creating a plurality of print plans based on, at least, coordinates of the object, the one or more contact points and one or more centralized locations; and
selecting, at least, a print plan of the at least one print plan from the plurality of print plans based on an optimization criterion.

10. The system of claim 9, wherein the optimization criterion comprises fewer movements of a printer head of the 3D printer, wherein the print plan selected uses fewer movements of the printer head than other print plans of the plurality of print plans.

11. A computer program product for facilitating three-dimensional printing of objects, the computer program product comprising:
one or more computer readable storage media and program instructions collectively stored on the one or more computer readable storage media to perform a method comprising:
determining for an object to be printed in three-dimensions (3D) one or more contact points relating to the object, wherein a contact point is at least one location on a base of a 3D printer in which a portion of the object is to contact the base based on printing the portion of the object;
determining a centralized location of the base in x and y directions at which one or more movable blocks of the base are to be moved to position the one or more contact points at the centralized location to facilitate printing one or more portions of the object at the centralized location, the centralized location being a region of the base in which the one or more portions of the object are printed in close proximity in the x and y directions; and
creating at least one print plan to be used to print the object in three-dimensions, the at least one print plan comprising one or more instructions to print at least the one or more portions of the object at the centralized location and one or more additional instructions to reposition in at least one direction of the x and y directions at least one movable block of the one or more movable blocks to a different position away from the centralized location to continue printing the object.

12. The computer program product of claim 11, wherein the one or more additional instructions comprise at least one instruction to print one or more remaining portions of the object, the one or more remaining portions of the object including a core of the object.

13. The computer program product of claim 11, wherein the method further comprises:
determining, based on performing, via, at least, a print plan of the at least one print plan, 3D printing of at least a part of the object, one or more metrics of a current status of the 3D printing of the object;
determining, based on the metrics, whether additional movement of at least one movable block of the base is to be performed; and
providing, based on determining that additional movement is to be performed, an indication of the additional movement of the at least one movable block to facilitate the performing the 3D printing.

14. The computer program product of claim 11, wherein the one or more additional instructions comprise at least one instruction to reposition, one or more times, at least one movable block of the one or more movable blocks to one or more different positions to continue printing the object.

15. The computer program product of claim 11, wherein the method further comprises:
creating a plurality of print plans based on, at least, coordinates of the object, the one or more contact points and one or more centralized locations; and
selecting, at least, a print plan of the at least one print plan from the plurality of print plans based on an optimization criterion.

16. A computer-implemented method of facilitating three-dimensional printing of objects, the computer-implemented method comprising:
determining for an object to be printed in three-dimensions (3D) one or more contact points relating to the object, wherein a contact point is at least one location on a base of a 3D printer in which a portion of the object is to contact the base based on printing the portion of the object;
determining a centralized location of the base in x and y directions at which one or more movable blocks of the base are to be moved to position the one or more contact points at the centralized location to facilitate printing one or more portions of the object at the centralized location, the centralized location being a region of the base in which the one or more portions of the object are printed in close proximity in the x and y directions; and
creating at least one print plan to be used to print the object in three-dimensions, the at least one print plan comprising one or more instructions to print at least the one or more portions of the object at the centralized location and one or more additional instructions to reposition in at least one direction of the x and y directions at least one movable block of the one or more movable blocks to a different position away from the centralized location to continue printing the object.

17. The computer-implemented method of claim 16, wherein the one or more additional instructions comprise at least one instruction to print one or more remaining portions of the object, the one or more remaining portions of the object including a core of the object.

18. The computer-implemented method of claim 16, further comprising:
determining, based on performing, via, at least, a print plan of the at least one print plan, 3D printing of at least a part of the object, one or more metrics of a current status of the 3D printing of the object;
determining, based on the metrics, whether additional movement of at least one movable block of the base is to be performed; and
providing, based on determining that additional movement is to be performed, an indication of the additional movement of the at least one movable block to facilitate the performing the 3D printing.

19. The computer-implemented method of claim 16, wherein the one or more additional instructions comprise at least one instruction to reposition, one or more times, at least one movable block of the one or more movable blocks to one or more different positions to continue printing the object.

20. The computer-implemented method of claim 16, further comprising:
  creating a plurality of print plans based on, at least, coordinates of the object, the one or more contact points and one or more centralized locations; and
  selecting, at least, a print plan of the at least one print plan from the plurality of print plans based on an optimization criterion.

* * * * *